United States Patent [19]
De Schrijver et al.

[11] Patent Number: 6,111,200
[45] Date of Patent: Aug. 29, 2000

[54] COLD SHRINKABLE PROTECTION ELEMENT FOR CABLE JOINT

[75] Inventors: Ivan Florent De Schrijver, Berlare; Annie Cheenne-Astorino, Merchtem, both of Belgium

[73] Assignee: Alcatel, Paris, France

[21] Appl. No.: 08/980,445

[22] Filed: Nov. 28, 1997

[30] Foreign Application Priority Data

Nov. 29, 1996 [EP] European Pat. Off. ............. 96402594

[51] Int. Cl.⁷ .................................................. H02G 15/08
[52] U.S. Cl. .................... 174/74 A; 174/DIG. 8; 174/93
[58] Field of Search ............. 174/DIG. 8, 73.1, 174/93, 74 A

[56] References Cited

U.S. PATENT DOCUMENTS

| Re. 30,817 | 12/1981 | Loyd et al. | 174/DIG. 8 X |
|---|---|---|---|
| 3,571,490 | 3/1971 | Bunish | 174/113 |
| 3,777,048 | 12/1973 | Traut | 174/73.1 |
| 4,234,758 | 11/1980 | Guzy | 174/DIG. 8 X |
| 4,431,861 | 2/1984 | Clabburn et al. | 174/DIG. 8 X |
| 4,444,816 | 4/1984 | Richards et al. | 174/DIG. 8 X |
| 4,450,318 | 5/1984 | Scardina et al. | 174/DIG. 8 X |
| 4,450,871 | 5/1984 | Sato et al. | 174/DIG. 8 X |
| 4,559,973 | 12/1985 | Hane et al. | 174/DIG. 8 X |
| 4,576,871 | 3/1986 | Oestreich | 174/DIG. 8 X |
| 4,650,703 | 3/1987 | Kleinheins | 174/DIG. 8 X |
| 4,781,979 | 11/1988 | Wilkus et al. | 174/110 AR X |
| 5,753,861 | 5/1998 | Hansen et al. | 174/93 |

FOREIGN PATENT DOCUMENTS

| 0379056 | 7/1990 | European Pat. Off. . |
|---|---|---|
| 0393495 | 10/1990 | European Pat. Off. . |
| 0415082 | 3/1991 | European Pat. Off. . |
| 0422567 | 4/1991 | European Pat. Off. . |
| 0678959 | 10/1995 | European Pat. Off. . |

OTHER PUBLICATIONS

"Relaxation Viscoelastique des Vulcanisats de Caoutchouc Entre al Transition Vitreuse et l'Equilibre", R. Chasset et al, in *R.G.C.P.*, vol. 44, No. 9, 1967, pp. 1041–1045.

*Primary Examiner*—Dean A. Reichard
*Attorney, Agent, or Firm*—Ware, Fressola, Van Der Sluys & Adolphson LLP

[57] ABSTRACT

A shrinkable protection element for covering filiform items, such as a joint between electrical cables. The element comprises a first (2) and second (3) sleeve, the second sleeve being coaxially superimposed upon the first one. Both sleeves are elastically expandable in a radial direction, i.e. shrinkable. The first sleeve is made up of a compound of cross-linked polymeric material including a peroxide curable hydrocarbon terpolyme of ethylene, propylene and a non conjugated dilene EPDM material, while the second sleeve is made of sulfur-cured EPDM material. As a result, the shrinking speed of the second sleeve (3) is higher than that of the first sleeve (2), especially at temperatures between 0° C. and 40° C. The cables may thereby be used about 30 minutes after the installation of the protection element thereon.

12 Claims, 3 Drawing Sheets

COLD SHRINKABLE PROTECTION ELEMENT FOR CABLE JOINT

BACKGROUND OF THE INVENTION

1. Technical Field

The present invention relates to a shrinkable protection element for covering filiform items, e.g. for covering a joint between two electrical cable-ends, said element including a first and second sleeve, both sleeves being elastically expandable in radial direction, being coaxially superimposed each upon the other and being made of compounds of cross-linked polymeric material for surrounding said joint in a radial elastically expanded condition, the first sleeve which is radially inside the second sleeve being electrically insulating at least for a part of its thickness.

2. Discussion of Related Art

Such a shrinkable protection element for cable joint is already known in the art, e.g. from the European Patent EP-B1-0 379 056 (PIRELLI CAVI, S.p.A.). Therein, the residual deformation of the second sleeve, after an imposed elongation applied in time, is smaller than that of the first sleeve. As a result, the risk of permanent deformation may be avoided and a good tightness against possible infiltration of moisture traces may be obtained. It is to be noted that the compound of cross-linkable polymeric material constituting the first sleeve of the protection element includes terbutylperoxy, while the compound of cross-linkable polymeric material constituting the second sleeve includes dicumyl peroxide. These compounds, both including a peroxide-cured Ethylene Propylene Diene Monomer material, hereafter called EPDM, that combine good electrical and mechanical properties. However, a problem with these compounds is that a relatively long time is required before the sleeves reach their final dimensions after stress relaxation, especially at low temperatures.

The above properties are therefore sometimes not applicable to applications which require a quick availability of the cables, i.e. a quick "mise en service". In such applications, it may be possible that the cables have to be available for use after about 30 minutes following the installation of the shrinkable protection element thereon, where in case the known shrinkable protection is used it takes many hours.

SUMMARY OF INVENTION

An object of the present invention is therefore to provide a shrinkable protection element of the above known type but which is faster in place, thereby allowing a quicker availability of the cables.

According to the invention, this object is achieved due to the fact that the shrinking speed of the cross-linked compound constituting said second sleeve is higher than the shrinking speed of the cross-linked compound constituting said first sleeve.

In this way, the cables are quickly available for use.

Another characteristic feature of the present invention is that said shrinking speed of said second sleeve is higher than said shrinking speed of said first sleeve at ambient temperature.

In more detail, said shrinking speed of said second sleeve is higher than said shrinking speed of said first sleeve at temperatures between 0° C. and 40° C.

The present shrinkable protection element is thereby well suited for a "cold shrink application".

Also another characteristic feature of the present invention is that said first sleeve is made of peroxide-cured Ethylene Propylene Diene Monomer material, while said second sleeve is made of sulfur-cured Ethylene Propylene Diene Monomer material.

It is known that the recovery of dimensional properties of peroxide-cured EPDM material is reduced with temperature decrease and that a sulfur-cured EPDM material recovers quickly its final dimensions. The second sleeve thus shrink faster than the first sleeve, especially at ambient temperature.

Yet another characteristic feature of the present invention is that said EPDM material includes:

200 part-by-weight of ethylene-propylene copolymer;
200 part-by-weight of calcined koolin vinyl silane treated;
1 part-by-weight of stearic acid;
5 part-by-weight of zinc oxide;
1 part-by-weight of trimethylquinoline;
20 part-by-weight of paraffinic plasticizer;
3 part-by-weight of processing aid; and
1 part-by-weight of conductive carbon black, all these quantities having a tolerance of about 10%.

The compound constituting said second sleeve is further characterized in that it includes:

0.55 part-by-weight of sulfur;
1.65 part-by-weight of dithiomorpholine;
1.20 part-by-weight of tetra methyl thiuram disulfide;
2.55 part-by-weight of zinc dibutyl dithio carbonate; and
1.25 part-by-weight of ethylene thiourea, all these quantities having a tolerance of about 10%.

Owing to this composition, it can be proved that the second sleeve has a quick short term recovery of its dimensions as requested to achieve the object of the invention.

In a preferred embodiment of the present invention, a metallic sock is provided between said first and said second sleeve.

This metallic sock, called "stockingette", realizes the screen continuity of the cable.

Also, at least said second sleeve has a length which is adapted for surrounding and for tightening the external jackets of the cables.

No additional elements, such as end-caps, are then required to insure the tightness of the joint, including the ends of the external jackets of the cables.

This tightness is further improved by a mastic filler that is located between said external jackets of the cables and said second sleeve.

This mastic filler is used for water sealing.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF PREFERRED EMBODIMENTS

Figure 1:
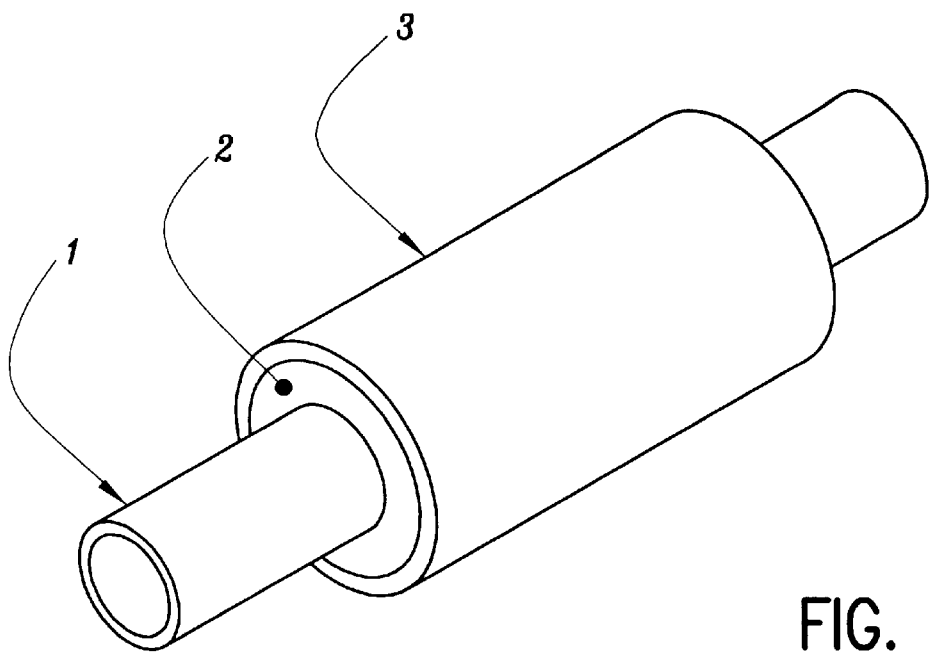
FIG. 1 is a perspective view of a cold shrinkable protection element for a joint of cable-ends according to the invention.

The FIG. 1 shows a shrinkable protection element which is used to cover joints or electrical connections of cables or any other portion of a longitudinal or filiform item such as wires. Hereafter, only the application consisting of placing the protection element on a cable joint will be considered as an example to describe the invention.

Prior to fitting the protection element on the cable joint, the element is mounted on a rigid tubular support 1 which is for instance a portion of a pipe of PVC. The inner diameter of the support 1 is of about 50 mm which is slightly greater than the outer diameter of the joint and of the external jacket of the cables whereon the protection element will be placed. The protection element itself is fitted on the support 1 in an elastically expanded condition so that, when the support 1 is removed, the protection element shrinks onto the joint with a good tightness.

The protection element itself is constituted by a first sleeve 2, hereafter called body, onto which a second sleeve 3, hereafter called protection sleeve or merely sleeve, is radially superimposed in a coaxial way. Both the body 2 and the sleeve 3 are elastically expandable in a radial direction and are made up of compounds of cross-linked polymeric material. In more detail, the body 2 is made of a compound including a peroxide-cured Ethylene Propylene Diene Monomer material, hereafter called EPDM, while the sleeve 3 is made of a compound including a sulfur-cured EPDM materials, both material having electrically insulating properties. In more detail, the compound of the body 2 includes a peroxide curable hydrocarbon terpolyme of ethylene, propylene and a non conjugated dilene. The EPDM material of the body 2 and of the sleeve 3 comprises for instance the following formulation:

| | |
|---|---|
| ethylene-propylene copolymer | 200 |
| calcined koolin vinyl silane treated | 200 |
| stearic acid | 1 |
| zinc oxide | 5 |
| trimethylquinoline | 1 |
| paraffinic plasticizer | 20 |
| processing aid | 3 |
| conductive carbon black | 1 | or any similar master batch.

The vulcanization process of the sleeve 3 is further characterized by the following composition:

| | |
|---|---|
| sulfur | 0.55 |
| dithiomorpholine | 1.65 |
| tetra methyl thiuram disulfide | 1.20 |
| zinc dibutyl dithio carbonate | 2.55 |
| ethylene thiourea | 1.25 | where all the amounts are given in parts-by-weight (pbw) with a tolerance of ±10%.

Owing to this composition, it will be shown that the shrinking speed of the cross-linked compound constituting this sleeve 3 is higher than the shrinking speed of the cross-linked compound constituting the body 2.

Figure 2:
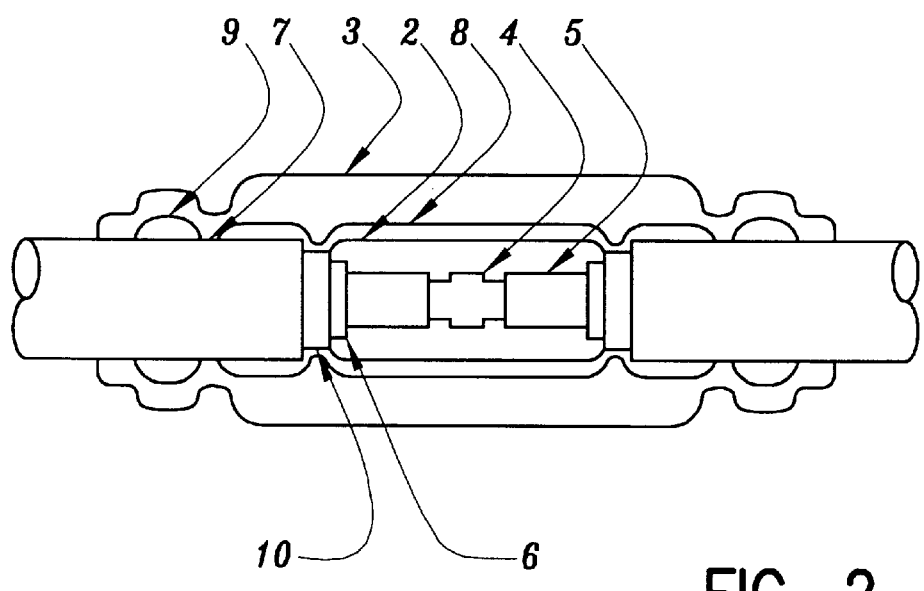
FIG. 2 is a longitudinal section of a joint of cable-ends covered by the protection element of FIG. 1.

The FIG. 2 shows a transversal section of a joint of cable-ends 5 protected by the present protection element. The joint itself is constituted by a metallic clamp or a soldering 4 linking mechanically and electrically the conductors forming part of the cable-ends 5. These cable-ends 5 are coated by a semi-conductive layer 6 which is further covered by an external jacket 7 of the cables.

To realize the protection, the support 1 (of FIG. 1), the body 2 and the sleeve 3 mounted thereon are first positioned over the joint. The support 1 is then removed according to techniques well known in the art and therefore not described hereafter because they are out of the scope of the invention.

When positioned over the joint to be protected, the body 2 and the sleeve 3 of the protection element, shrink onto these elements as shown in FIG. 2. In a preferred embodiment, at least the protection sleeve 3 extends over a portion of the external jackets 7 of the two cables so that a it protects with a tight fit not only the joint but also the cable-ends against possible infiltration of moisture traces. Moreover, a mastic filler 9 is then preferably provided between the ends of the external jackets 7 and the sleeve 3 for water sealing, improving thereby the tightness of the protection. A metallic sock 8, called "stockingette", is provided between the body 2 and the sleeve 3. The purpose of this metallic sock 8 is to realize the cable screen continuity over the joint 4. To this end, a so-called "cheese-rasp" 10 is applied to each of the cables. A cheese-rasp 10 is a metallic element inserted between a metallic screen (not shown) located inside the external jacket 7 and the semi-conductive layer 6. The cheese-rasp 10 extends outside the jacket 7 covering partially the layer 6. Because of the pressure applied by the protection sleeve 3 on the stockingette 8, the latter is electrically in contact with the cheese-rasp 10 and so further with the internal metallic screens of the two cables, whereby the cable screen continuity is ensured.

Owing to the fact that the protection sleeve 3 is made of sulfur-cured EPDM, its shrinking speed is higher than that of the body 2 which is made of peroxide-cured EPDM. In other words, the sleeve 3 recovers its final dimensions faster than the body 2. This is particularly true for temperatures between 0° C. and 40° C., i.e. also at the ambient temperature. As a result, an instantaneous sealing of the cable joint by the protection element is ensured at low temperature. The latter is known as a "cold shrink application". In fact, the protection element 2, 3 may be considered as operational 30 minutes after its installation on the joint 4.

Tests have been made according to internal specifications. A protection element has been extended to 250% for 100 hours at a temperature of 65° C. The percentage of residual set (% set) in function of the time after stress release (expressed in hours) is reported in the following table:

| Time [hours] | BODY (2) | SLEEVE (3) |
|---|---|---|
| 0.0167 | 20.8 | 18.8 |
| 0.0375 | 18.4 | 14.4 |
| 0.0833 | 15.6 | 14.0 |
| 0.167 | 15.2 | 14.0 |
| 0.335 | 12.0 | 14.0 |
| 0.501 | 10.4 | 13.6 |
| 1 | 9.6 | 13.6 |
| 2 | 8.8 | 13.6 |
| 15.5 | 6.6 | 12.4 |

These measurements were performed at ambient temperature and the results fit to the following relation:

$$\% \text{ set} = PS * \left[1 + \left[\frac{t}{\tau}\right]^{-m}\right]$$

which is the power equation for the relaxation of viscoelastic solids that can, for instance, be found in the book "Viscoelastic Relaxation of Rubber Vulcanizates between the Glass Transition and Equilibrium" by R. Chasset and P. Thirion, Institut Français du Caoutchouc, Paris, France, pages 345 to 359. In this relation:

PS is the permanent set (% set at infinite t);

t is the time;

τ is the time constant (time where % set equals 2 times PS); and m is the power coefficient.

Which, for body or first sleeve 2, gives:

$$\% \text{ set(sleeve 2)} = 3.6 * \left[1 + \left[\frac{t}{10}\right]^{-0.25}\right]$$

whilst, for the protection sleeve or second sleeve 3:

$$\% \text{ set(sleeve 3)} = 6.4 * \left[1 + \left[\frac{t}{7.5}\right]^{-0.05}\right]$$

Figure 3:
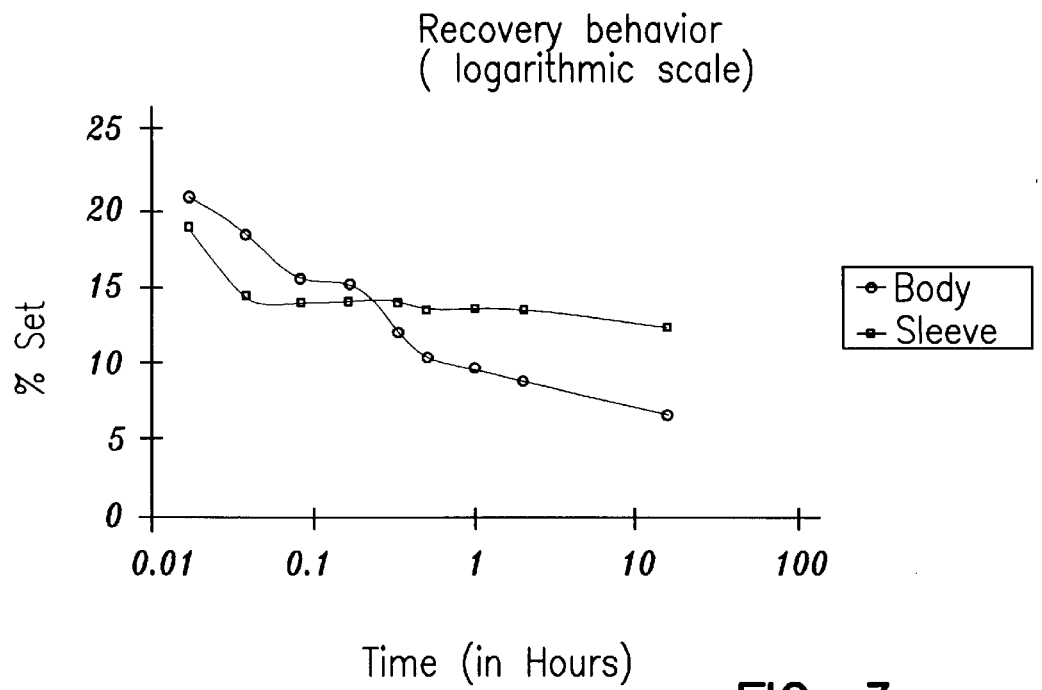
FIGS. 3 and 4 represent the residual set evolution after stress release on the sleeves 2 and 3 of the protection element of FIG. 1 according to internal test specifications.
Figure 4:
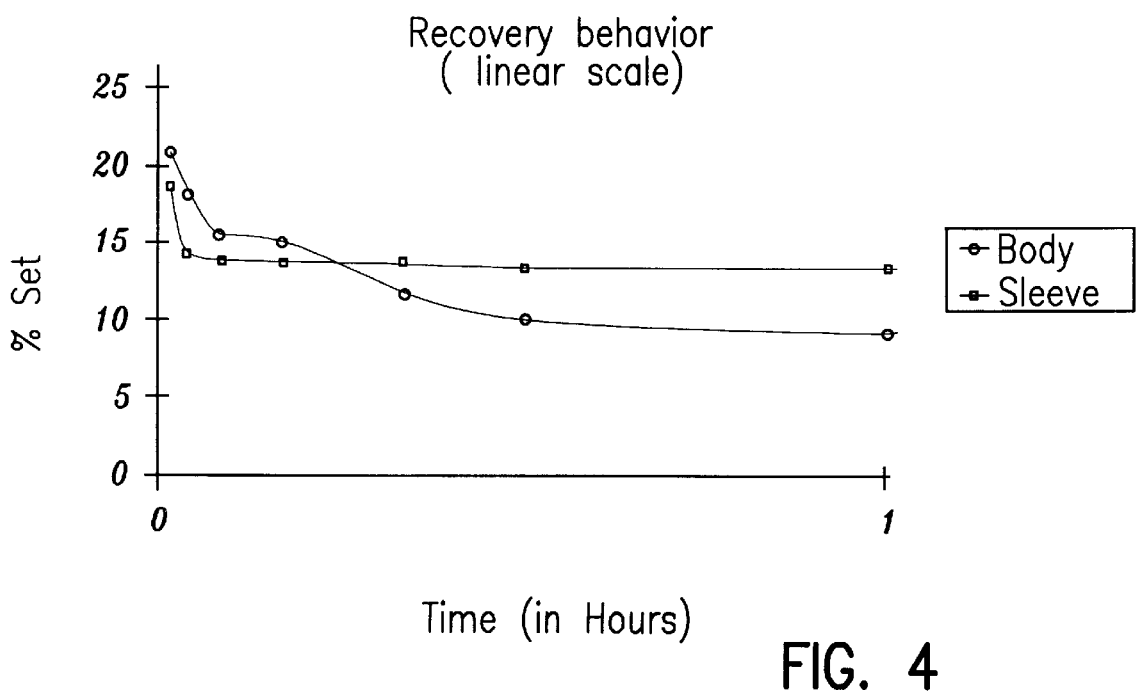

The graphs resulting from these tests are showed in FIG. 3 at a logarithmic scale and in FIG. 4 at a linear scale. These graphs illustrate the benefit of using a sulfur cured system. The recovery behavior of the sleeve 3 is quite different to that of the body 2. Because of the spontaneous recovery, after expansion, of the sleeve 3, the latter accelerates the recovery of the body 2 during the first moments of retraction onto the cable.

The slope difference between the body 2 and the protection sleeve 3 shows that the body 2 has a low permanent set, but a slow recovery, while the sleeve 3 has a quick short term recovery, but a higher final set. This is due to the above sulfur cured compound constituting the protection sleeve 3. Owing to its composition, the protection sleeve 3 is easily expandable and exhibits a much better short term behavior than the highly cross-linked peroxide cured body 2. It however has weaker mechanical properties and a high elongation at break. Moreover, the permanent deformation of a cross-linked compound including a sulfur-cured EPDM material as for the second sleeve 3 is higher than that of a cross-linked compound including a peroxide-cured EPDM material as for the body or first sleeve 2.

In the above relations, it appears that the lower t-, and especially the lower m-value of the sulfur cured product are responsible for the faster short term shrinking in the dynamic behavior of the sleeve.

Other tests have been made according to the UNI 7321-74 standards. In these tests, the residual deformation due to an imposed elongation of 50% on a flat specimen at a temperature of 100° C. and after a time of 500 hours has been measured. The percentage of residual set (% set) after stress release in function of the expansion time (expressed in hours) is reported in the following table:

| Residual set (% set) | BODY (2) | SLEEVE (3) |
| --- | --- | --- |
| after 100 hours | 19.6 | 20.0 |
| after 500 hours | 21.2 | 24.4 |

Figure 5:
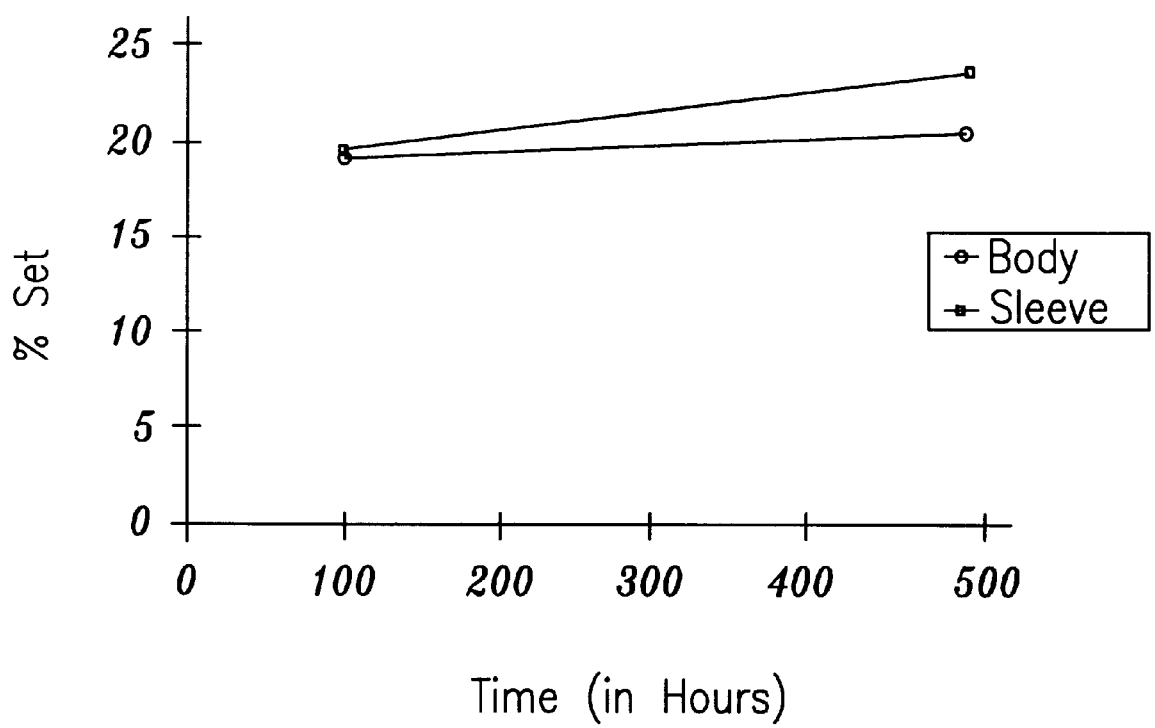
FIG. 5 represents the residual set in function of the expansion time of the sleeves 2 and 3 of the protection element of FIG. 1 according to UNI 7321-74 tests.

The residual set (% set) has been measured at ambient temperature 30 minutes after stress release and the test results, shown in FIG. 5, confirm the above conclusions.

While the principles of the invention have been described above in connection with specific apparatus, it is to be clearly understood that this description is made only by way of example and not as a limitation on the scope of the invention.

We claim:

1. Cold shrinkable protection element (2, 8, 3) for covering a joint (4) between two electrical cable-ends (5) connected to electrical cables, said element including a first (2) and a second (3) sleeve, both sleeves being elastically expandable in a radial direction, being coaxially superimposed each upon the other and being made of compounds of cross-linked polymeric material for surrounding said joint (4) in a radial elastically expanded condition, the first sleeve (2) which is radially inside the second sleeve (3) being electrically insulating at least for a part of its thickness, characterized in that a shrinking speed of the cross-linked compound constituting said second sleeve (3) is higher than a shrinking speed of the cross-linked compound constituting said first sleeve (2) at temperatures between 0° and 40° C.

2. Shrinkable protection element according to claim 1, characterized in that the compound constituting said second sleeve (3) includes:

0.55 part-by-weight of sulfur;

1.65 part-by-weight of dithiomorpholine;

1.20 part-by-weight of tetra methyl thiuram disulfide;

2.55 part-by-weight of zinc dibutyl dithio carbonate; and 1.25 part-by-weight of ethylene thiouera, all these quantities having a tolerance of about 10%.

3. Shrinkable protection element according to claim 1, characterized in that a metallic sock (8) is provided between said first (2) and said second (3) sleeve.

4. Shrinkable protection element according to claim 1, characterized in that the shrinkable protection element is structurally sound and operational within 30 minutes after installation on said joint (4).

5. Shrinkable protection element according to claim 1, characterized in that said first sleeve (2) is made of peroxide-cured Ethylene Propylene Diene Monomer material, and said second sleeve (3) is made of sulfur-cured Ethylene Propylene Diene Monomer material.

6. Shrinkable protection element according to claim 5, characterized in that either Ethylene Propylene Diene Monomer material includes:

200 parts-by-weight of ethylene-propylene copolymer;

200 parts-by-weight of calcined kaolin vinyl silane treated;

1 parts-by-weight of stearic acid;

5 parts-by-weight of zinc oxide;

1 parts-by-weight of trimethylquinoline;

20 parts-by-weight of paraffinic plasticizer;

3 parts-by-weight of processing aid; and 1 parts-by-weight of conductive carbon black, all these quantities having a tolerance of about 10%.

7. Shrinkable protection element according to claim 1, characterized in that at least said second sleeve (3) has a length which is adapted for surrounding and for tightening external jackets (7) of the cables.

8. Shrinkable protection element according to claim 7, characterized in that a mastic filler (9) is located between said external jackets (7) of the cables and said second sleeve (3).

9. Shrinkable protection element (2, 8, 3) for covering a joint (4) between two electrical cable-ends (5) connected to electrical cables, said element including a first (2) and second (3) sleeve, both sleeves being elastically expandable in a radial direction, being coaxially superimposed each upon the other and being made of compounds of cross-linked polymeric material for surrounding said joint (4) in a radial elastically expanded condition, the first sleeve (2) which is radially inside the second sleeve (3) being electrically insulating at least for a part of its thickness, wherein said first sleeve (2) is made of peroxide-cured Ethylene Propylene Diene Monomer material and said second sleeve (3) is made of sulfur-cured Ethylene Propylene Diene Monomer material having a relatively higher shrinking speed than a shrinking speed of said peroxide-cured Ethylene Propylene Diene Monomer material.

10. Shrinkable protection element according to claim 9, characterized in that said sulfur-cured Ethylene Propylene Diene Monomer material includes:

200 parts-by-weight of ethylene-propylene copolymer;

200 parts-by-weight of calcined kaolin vinyl silane treated;

1 parts-by-weight of stearic acid;

5 parts-by-weight of zinc oxide;

1 parts-by-weight of trimethylquinoline;

20 parts-by-weight of paraffinic plasticizer;

3 parts-by-weight of processing aid; and 1 parts-by-weight of conductive carbon black, all these quantities having a tolerance of about 10%.

11. Shrinkable protection element according to claim 9, characterized in that a shrinking speed of said cross-linked compound constituting second sleeve (3) is relatively higher than a shrinking speed of said cross-linked compound constituting said first sleeve (2) at temperatures between 0° C. and 40° C.

12. Shrinkable protection element (2, 8, 3) for covering a joint (4) between two electrical cable-ends (5) connected to electrical cables, said element including a first (2) and second (3) sleeve, both sleeves being elastically expandable in a radial direction, being coaxially superimposed each upon the other and being made of compounds of cross-linked polymeric material for surrounding said joint (4) in a radial elastically expanded condition, the first sleeve (2) which is radially inside the second sleeve (3) being electrically insulating at least for a part of its thickness, wherein the compound constituting said second sleeve (3) includes:

0.55 parts-by-weight of sulfur;

1.65 parts-by-weight of dithiomorpholine;

1.20 parts-by-weight of tetra methyl thiuram disulfide;

2.55 parts-by-weight of zinc dibutyl dithio carbonate; and 1.25 parts-by-weight of ethylene thiourea, all these quantities having a tolerance of about 10%, and wherein a shrinking speed of the cross-linked compound constituting said second sleeve (3) is relatively higher than a shrinking speed of the cross-linked compound constituting said first sleeve (2).

* * * * *